United States Patent
King et al.

(10) Patent No.: US 9,504,860 B2
(45) Date of Patent: Nov. 29, 2016

(54) PROTECTIVE COVERS AND RELATED FABRICS

(75) Inventors: Clare R. King, Providence, RI (US); Vishal Bansal, Overland Park, KS (US); Leo J. Crotty, Jr., Portsmouth, NH (US)

(73) Assignee: BHA Altair, LLC, Franklin, TN (US)

( * ) Notice: Subject to any disclaimer, the term of this patent is extended or adjusted under 35 U.S.C. 154(b) by 2010 days.

(21) Appl. No.: 11/482,105

(22) Filed: Jul. 7, 2006

(65) Prior Publication Data

US 2013/0330524 A1  Dec. 12, 2013

Related U.S. Application Data

(63) Continuation-in-part of application No. 11/123,076, filed on May 6, 2005, now abandoned.

(51) Int. Cl.

| | |
|---|---|
| *A62B 29/00* | (2006.01) |
| *B32B 5/02* | (2006.01) |
| *B32B 5/26* | (2006.01) |
| *B32B 27/08* | (2006.01) |
| *B32B 3/10* | (2006.01) |
| *A62B 15/00* | (2006.01) |
| *B32B 5/18* | (2006.01) |
| *B32B 27/12* | (2006.01) |
| *B32B 27/16* | (2006.01) |
| *B32B 27/32* | (2006.01) |
| *B32B 3/08* | (2006.01) |
| *B32B 5/00* | (2006.01) |

(52) U.S. Cl.
CPC ............... *A62B 29/00* (2013.01); *A62B 15/00* (2013.01); *B32B 3/08* (2013.01); *B32B 3/10* (2013.01); *B32B 5/00* (2013.01); *B32B 5/02* (2013.01); *B32B 5/022* (2013.01); *B32B 5/024* (2013.01); *B32B 5/026* (2013.01); *B32B 5/18* (2013.01); *B32B 5/26* (2013.01); *B32B 27/08* (2013.01); *B32B 27/12* (2013.01); *B32B 27/16* (2013.01); *B32B 27/322* (2013.01); *B32B 2250/03* (2013.01); *B32B 2255/02* (2013.01); *B32B 2255/205* (2013.01); *B32B 2262/0261* (2013.01); *B32B 2262/0276* (2013.01); *B32B 2305/026* (2013.01); *B32B 2307/714* (2013.01); *B32B 2307/724* (2013.01); *B32B 2307/726* (2013.01); *B32B 2307/728* (2013.01); *B32B 2457/00* (2013.01); *B32B 2571/00* (2013.01); *B32B 2605/00* (2013.01); *Y10T 428/2481* (2015.01); *Y10T 428/24818* (2015.01); *Y10T 442/365* (2015.04); *Y10T 442/3707* (2015.04); *Y10T 442/3878* (2015.04); *Y10T 442/40* (2015.04); *Y10T 442/488* (2015.04); *Y10T 442/494* (2015.04); *Y10T 442/659* (2015.04); *Y10T 442/677* (2015.04)

(58) Field of Classification Search
USPC ................ 428/315.5, 195.1, 196, 197; 2/69; 361/212; 442/110, 255, 136, 138, 139, 442/261
See application file for complete search history.

(56) References Cited

U.S. PATENT DOCUMENTS

| | | |
|---|---|---|
| 3,660,138 A | 5/1972 | Gorrell |
| 5,102,711 A | 4/1992 | Keller et al. |

(Continued)

FOREIGN PATENT DOCUMENTS

GB        2316341     *  2/1998  ............. A41D 31/02

*Primary Examiner* — Lynda Salvatore
(74) *Attorney, Agent, or Firm* — Reinhart Boerner Van Deuren P.C.

(57) ABSTRACT

A protective cover includes a textile layer and an air permeable, moisture-vapor-transmissive, expanded polytetrafluoroethylene membrane layer attached to said textile layer, the cover having an MVTR rating of at least 4000 g/m²/day.

13 Claims, 3 Drawing Sheets

(56) References Cited

U.S. PATENT DOCUMENTS

| | | | |
|---|---|---|---|
| 6,018,819 A * | 2/2000 | King et al. | 2/69 |
| 6,228,477 B1 * | 5/2001 | Klare et al. | 428/315.5 |
| 6,444,595 B1 | 9/2002 | Elkouh et al. | |
| 6,473,910 B2 * | 11/2002 | Creagan et al. | 2/458 |
| 6,520,926 B2 * | 2/2003 | Hall | 602/64 |
| 6,794,317 B2 | 9/2004 | Elkouh et al. | |
| 6,854,603 B2 | 2/2005 | Klare | |
| 2003/0167551 A1 * | 9/2003 | Findlay | 2/93 |

\* cited by examiner

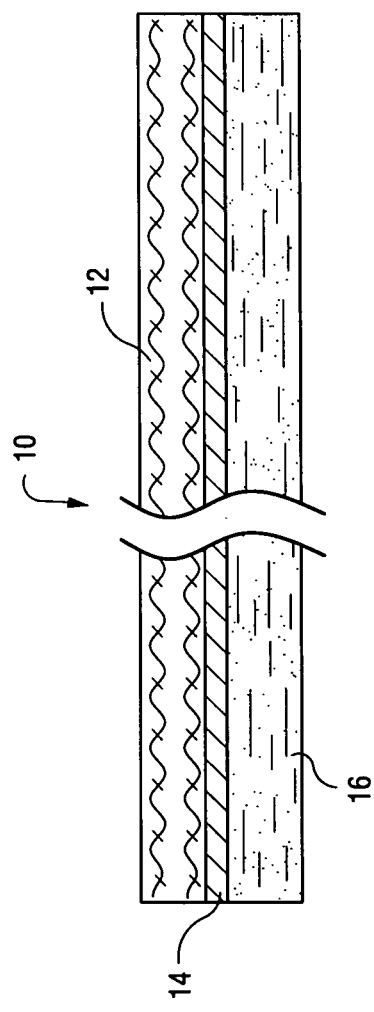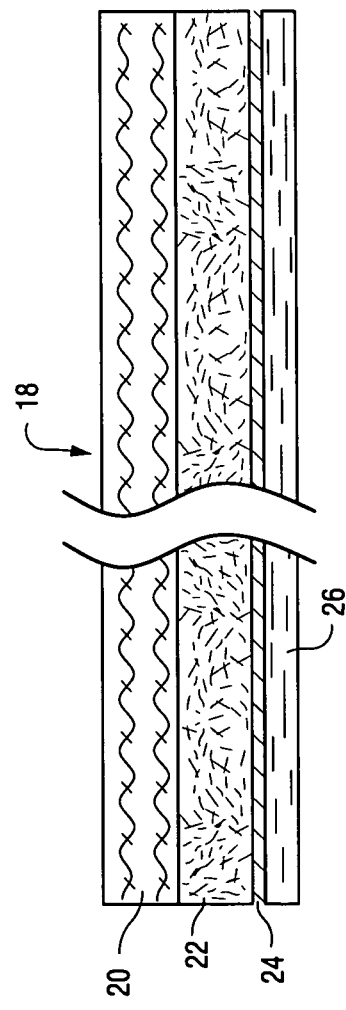
Fig. 1
Fig. 2

PROTECTIVE COVERS AND RELATED FABRICS

This is a continuation-in-part of application Ser. No. 11/123,076, filed May 6, 2005 (now abandoned).

This invention relates to protective covers for equipment typically stored outdoors such as airplanes, vehicles, munitions, weapons and weapons systems, electrical equipment and the like, as well as fabrics for such protective covers.

BACKGROUND OF THE INVENTION

Protective covers are often used to protect equipment and parts in a wide range of environmental conditions. Corrosion and oxidation are of particular concern, especially in connection with vehicles, airplanes, munitions, weapons and weapons systems and equipment with metal and/or electronic components and the like.

Prior protective covers that address the problem of corrosion are described in U.S. Pat. Nos. 6,794,317 and 6,444,595. There remains a need, however, for more effective covers that provide protection and resistance to penetration of water, wind and sand, and that are especially effective with respect to the prevention or at least minimization of oxidation and/or corrosion due to humidity build-up around the covered objects.

BRIEF DESCRIPTION OF THE INVENTION

In accordance with an exemplary embodiment of this invention, an air permeable protective cover is provided that is designed to prevent the ingress of moisture but, at the same time, to allow moisture vapor underneath the cover to readily pass through to the outer environment, thereby preventing humidity buildup and thus helping to prevent or at least minimize oxidation and corrosion of the covered object.

In the exemplary embodiment, the cover is composed of a plurality of laminated layers of different materials. The multiple layers include at least an outer textile layer, an intermediate film or membrane of ePTFE or other similar hydrophobic material having good air permeability and moisture-vapor-transmission properties, and an inner textile layer that faces toward the object being covered. For specific applications, the ePTFE membrane may be an air permeable, breathable, treated membrane such as an eVENT® membrane available from BHA Technologies. An optional fourth fabric layer between the outer layer and the film or membrane may incorporate Super Absorbing Polymers (SAPs) to prevent reabsorption of moisture back through the cover. Corrosion or other inhibitors, such as an anti-microbial to inhibit mold, may also be included in either the textile layers or the membrane itself. All of the various embodiments preferably take advantage of moisture-wicking materials as the laminate layers to help remove moisture vapor from the covered equipment. The various layers or laminations are held together by adhesive or any other acceptable method in order to achieve the required durability of the final product.

The protective covers described herein preferably have a Moisture Vapor Transmission Rating (MVTR) of at least 4000 g/m$^2$/day or more.

In all cases, the inner textile layer may have material such as silicone dots applied to the inner face thereof, so that contact between the cover and the object to be protected is minimized if not eliminated, and to thereby enhance the moisture vapor transmission away from the object.

Textiles suitable for the outer layer include woven, knit and non-woven fabrics such as nylon plain weave and ripstop-fabrics, warp knit fabrics, woven Cordura®, a registered trademark of Invista, fabric, Nomex® and Kevlar® (both registered trademarks of Dupont) fabrics, including blends Taslan fabrics (70-160D) and equivalents.

Textiles suitable for the inner layer include woven, knit and non-woven fabrics such as lightweight warp or circular knit fabrics using nylon, polyester, Nomex® and equivalent fabrics, spunbond nylon and equivalents.

Accordingly, in one aspect, the invention relates to a protective cover comprising a textile layer and an air permeable, moisture-vapor-transmissive, expanded polytetrafluoroethylene membrane layer attached to the textile layer, the cover having an MVTR of at least 4000 g/m$^2$/day.

In another aspect, the invention relates to a fabric for use in protective covers, the fabric comprising at least three layers including an outer woven, knit or non-woven fabric layer and an inner woven, knit or non-woven fabric layer, and a moisture-vapor-transmissive, air permeable and oleophobic expanded polytetrafluoroethylene membrane layer between the outer and inner layers; the fabric having an MVTR of at least 4000 g/m$^2$/day.

The invention will now be described in detail in connection with the single drawing figure described below.

BRIEF DESCRIPTION OF THE DRAWINGS

FIG. 1 is a cross section through a laminated protective cover in accordance with an exemplary embodiment of the invention;

FIG. 2 is a cross section similar to FIG. 1 but with an additional textile layer interposed between the inner and outer layers;

DETAILED DESCRIPTION OF THE INVENTION

Figure 3:
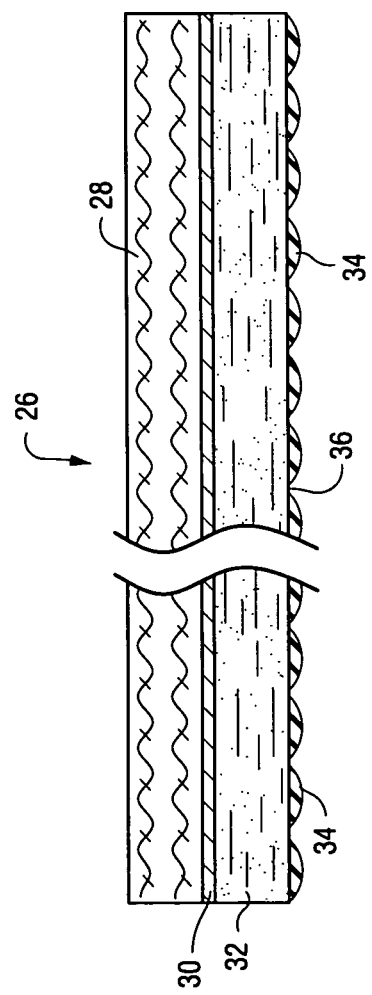
FIG. 3 is a cross section similar to FIG. 1 but with a plurality of spacers applied to the exposed face of the inner layer.

Referring to FIG. 1, a protective cover 10 is composed of laminated layers of different materials. The protective cover can comprise a sheet of predetermined length and form and used to cover the intended object as a tarp. In addition, the laminated material forming the protective cover may be cut and sewn to fit more precisely a specific object or item of equipment. The seams of this cut and sewn cover may also have seams that are taped with a compatible material or are welded, in either case so that the finished cover is durably waterproof. In the exemplary embodiment, at least three laminated layers are employed. These include an outer textile fabric or face layer 12 that may be composed of suitable woven or non-woven textiles. For example, the outer layer may comprise a high tenacity nylon 6,6 ripstop face fabric available from Precision Fabrics Group, Inc. of Greensboro, N.C. This fabric is of 0.003-0.004 in. thickness with 120 warp ends and 120 filling picks, with an air permeability of 80-120 cfm/sq. ft and a weight of 1.1-1.3 oz/yd$^2$. Suitable Nylon 6,6 ripstock face fabric is also available from Mitsui Textiles of Japan. Another suitable material for the outer textile fabric layer 12 is a 160 Denier Cordura® woven fabric such as Milliken Style 900496-4.

The fabric has a weight of 4.5 oz./sq. yd. and is available from Millken Fabrics of Spartanburg, S.C. Other suitable textiles include nylon Taslan 70 Denier fabrics, and high modulus woven polyester fabrics available from various suppliers.

The outer fabric layer may be treated to be durably water-resistant, with available treatments including, for example, a Teflon® finish from Dupont or other similar finish from Invista or other known suppliers.

An interior intermediate layer 14 is in the form of a hydrophobic film or membrane with good air permeability and moisture-vapor-transmission properties. In the exemplary embodiment, layer 14 is an expanded polytetrafluoroethylene (ePTFE). The expansion of polytetrafluroethylene opens billions of microscopic pores in the resulting film or membrane to enhance air permeability and water vapor transmission rate. The ePTFE layer or membrane is also treated to render it permanently oleophobic, waterproof and hydrophobic. A treated membrane of this type is commercially available from BHA Technologies under the trade name eVENT® Fabric. The oleophobic property of this membrane is particularly beneficial in that equipment, particularly military equipment, is often sprayed with oil to minimize corrosion. The ePTFE may also be rendered resistant to hydraulic fluid, diesel fuel, weapon lubricants and similar field chemicals.

It is believed that the unique value that eVENT® Fabric offers is its ability to eliminate moisture condensation on the article covered while providing a completely waterproof protection (resists liquid water penetration at pressure as high as 10 meters of hydrostatic head). Moisture condenses on the surfaces if the protective cover cannot "breathe." This happens due to environmental temperature swings during the storage. For example, if an object is covered with a non-breathable protective cover and the environmental conditions are 25 dg C temperature and 50% relative humidity, then a drop of ambient temperature by 12 dg C would drive the relative humidity inside to over 100% and hence lead to condensation. Utilizing an eVENT® membrane would keep the relative humidity inside equilibrated to the ambient conditions by allowing the moisture vapors to escape out.

The inner textile layer 16 faces the object to be covered, and it is therefore preferable that the exposed surface be smooth so as not to scratch covered equipment. This textile fabric layer may be composed of woven, knits, and non-woven fabrics such as lightweight tricot warp knits of polyester or nylon. Such materials include Style 1158 manufactured by Hornwood and available from K-Tex of Wayne N.J., or Style #0862, a 100% semi-dull nylon 6,6 with 52 courses and 42 wales and a weight of 0.9 oz. per sq.yd., available from Somerset Industries of Gloversville, N.Y. Also suitable are non-woven spunbond nylon fabrics such as Cerex Advanced Fabrics Orion style #70 having a weight of 0.7 oz./sq. yd. and a thickness of 6-7 mil. Another suitable fabric is yellow Nexus® non-woven polyester having a weight of 1-1.2 oz./yd$^2$, and a thickness of 0.008-0.012 in., also available from Precision Fabrics Group. The inner layer may also be hydrophilic, either by treatment or choice of fibers and construction, helping to wick moisture away from the covered object and to spread the moisture laterally, facilitating the vapor transmission through the cover to the outside. The inner layer may also be rendered electrically conductive by either weaving in of inherently conductive fibers or by topical treatment.

Referring now to FIG. 2, a second cover 18 includes an outer textile or face layer 20 similar to face layer 12, overlying an interior textile fabric layer incorporating super-absorbent polymers (SAPS). The textile fabric 22 is preferably a suitable non-woven fabric enclosing the SAP's in an otherwise conventional fashion. The layer 22 in turn overlies an ePTFE film or membrane 24 similar to membrane 20. The inner layer 26 is a textile fabric that may be of a material similar as inner textile layer 16 described hereinabove. Use of SAPs in the fabric layer 22 minimizes the possibility of reabsorption of moisture back into the space below the cover.

FIG. 3 illustrates a variation of the embodiment shown in FIG. 1. As such, the outer textile or face layer 28, intermediate membrane 30 and inner textile layer 32 are similar to the corresponding layers described hereinabove in connection with FIG. 1. Here, however, the cover 26 also includes a plurality of silicone (or other suitable material) spacers or dots 34 applied to the exposed face 36 of the inner layer 32. The dots 34 may be applied in any random or patterned configuration and serve to maintain a space between (or at least minimize contact between) the object to be covered and the inner textile layer 32.

With the above configurations, the laminated protective cover allows moisture to be expelled readily from the interior covered area through the laminated cover itself to the outside environment. In this regard, the cover fabric and cover itself preferably have an MVTR of at least 4000 to about 8000 g/m$^2$/day and as high as 14000 g/m$^2$/day or more, per ISO 15496 (inverted cup method). The cover thus provides environmental protection and resistance to penetration of water, wind and sand. The cover may be especially useful in the prevention of corrosion during transportation of military vehicles or other equipment, and protection from contamination by chemical and biological warfare agents.

In the specific comparative example below an ePTFE laminate cover in accordance with the invention is constructed of three layers including:

(a) Nylon 6,6 Ripstop face fabric available from Mitsui Textiles, Japan;

(b) ePTFE membrane;

(c) Nexus® polyester spunlace, 30 g/m$^2$, available from Precision Fabrics Group.

The ePTFE laminate is available from BHA Technologies, Inc. under the name eV5004-3L.

EXAMPLE 1

The following commonly used protective cover materials were compared against the above ePTFE laminate (1) Herculite® 90 Coated Cover Fabric available from Manart-Hirsch Co., Inc., NY (2) Sunbrella® Marine Canvas Cover Fabric available from Great Lakes Fabrics Inc., MI as their product number 4630

(3) Polyethylene shrink wrap (Marine Boat cover) available from Shrinkwrap International Inc., MI Mild Steel corrosion coupons were obtained from Metal Samples Company, AL. Each coupon was 2"×1"×1/16" in dimensions. Ten such coupons were wrapped in each of the four cover materials and left in an open parking lot for a period of two weeks. At the end of two weeks, the condition of the coupons was evaluated for signs of rusting. They were graded on a scale of 1 to 5, with 1 indicating that none of the tens coupons were visually rusted and 5 indicating that all ten coupons were visually rusted.

The results from this evaluation are given in the table below. Also listed is the moisture vapor transmission rate of each of the four laminates.

| COVER MATERIAL | Corrosion Rating (average of ten repeats) | MVTR (ISO 15496, inverted cup) |
| --- | --- | --- |
| Herculite ® 90 | 4.8 | 0 |
| Sunbrella ® Marine Canvas | 2.6 | 6,900 g/m²/day |
| Polyethylene shrink wrap (Marine Boat cover) | 4.2 | 0 |
| ePTFE laminate (eV5004-3L) | 1.1 | 14,000 g/m²/day |

It is also within the scope of this invention to add a layer of air (gas) permeable insulation such as Primaloft® within the laminate, specifically under the membrane, to retain heat under the cover. In addition, a metal (e.g., aluminum) reflective coating may be applied to the exposed inner face of the inner layer for reflecting heat and/or for its electrostatic dissipative properties.

Another variation includes the addition of a durable water repellant coating on the exposed face of the outer textile layer.

Some of the applications for these laminate fabrics are protective covers that are particularly useful in situations where there is need for protection against dust, rain, microbes, UV light exposure, while minimizing corrosion. For example:

(a) Protective covers for military and civilian helicopters and other aircraft;
(b) Protective covers for military ground vehicles;
(c) Protective covers for ground aviation equipment;
(d) Protective covers for shipboard equipment;
(e) Boat covers;
(f) Vehicle covers (e.g., motorcycles, automobiles, etc.);
(g) Military Tank hatch covers; and
(h) Personal arms protective covers.

Figure 4:
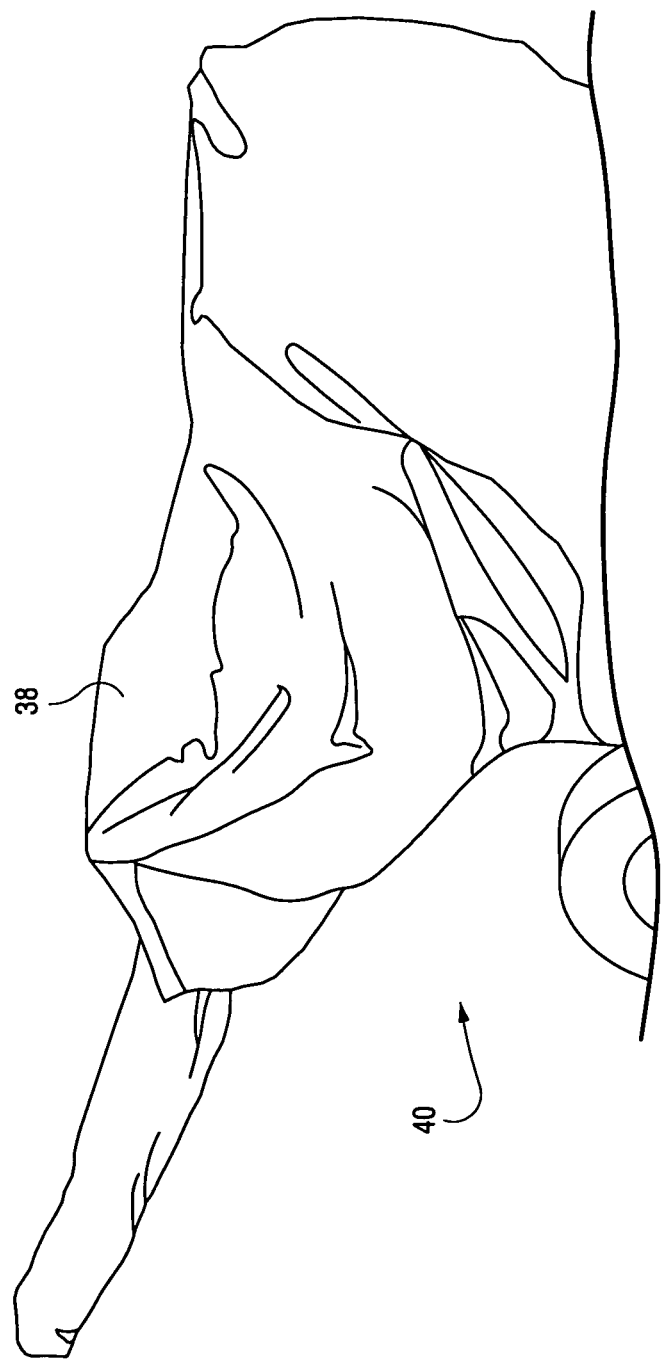
FIG. 4 is a partial perspective view of a protective cover in accordance with the invention applied over a military weapon.

FIG. 4 illustrates one of many applications for the protective covers as described herein. Specifically, a cover 38 is shown in place, covering a military weapon 40.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A protective cover for equipment comprising an outer textile layer, an inner textile layer having an inner face wherein the inner face is exposed to the equipment to be covered, and an air permeable, moisture-vapor-transmissive, expanded polytetrafluoroethylene membrane layer attached to said textile layer, the cover having an MVTR of at least 4000 g/m²/day, said membrane layer located between said inner and outer textile layers;
    wherein the exposed inner face comprises a plurality of spacer dots, the spacer dots configured to contact the equipment to be covered and minimize contact between the equipment and the inner textile layer,
    and wherein the exposed inner face further comprises an electrostatic-dissipative metal coating.

2. The protective cover of claim 1 wherein said outer textile layer is chosen from a group comprising woven, knit and non-woven fabrics.

3. The protective cover of claim 1 wherein said inner textile layer and said outer textile layer are each chosen from a group comprising woven, knit and non-woven fabrics.

4. The protective cover of claim 1 wherein said outer textile layer is treated to render said outer textile layer hydrophobic.

5. The protective cover of claim 1 wherein said inner textile layer is treated to render said inner textile layer hydrophilic.

6. The protective cover of claim 1, further comprising an interior textile layer incorporating super-absorbent polymers arranged between said outer textile layer and said membrane layer.

7. The protective cover of claim 1 wherein said spacer dots are composed of silicone.

8. The protective cover of claim 1 wherein said outer textile layer comprises a nylon 6, 6 ripstock fabric.

9. The protective cover of claim 1 wherein said outer textile layer comprises a polyester fabric.

10. The protective cover of claim 1 wherein said inner textile layer comprises a nonwoven polyester fabric.

11. The protective cover of claim 1 wherein said membrane layer is hydrophobic.

12. The protective cover of claim 1 wherein said membrane layer is treated it render it oleophobic.

13. The protective cover of claim 1 having an MVTR of about 8000 g/m²/day.

* * * * *